US 9,061,832 B2

(12) United States Patent
Rack et al.

(10) Patent No.: US 9,061,832 B2
(45) Date of Patent: Jun. 23, 2015

(54) POUCH TRANSFER APPARATUS AND METHODS

(71) Applicants: Daniel J. Rack, Cincinnati, OH (US); Frank G. Oliverio, Cincinnati, OH (US)

(72) Inventors: Daniel J. Rack, Cincinnati, OH (US); Frank G. Oliverio, Cincinnati, OH (US)

(73) Assignee: R.A. Jones & Co., Covington, KY (US)

( * ) Notice: Subject to any disclaimer, the term of this patent is extended or adjusted under 35 U.S.C. 154(b) by 0 days.

(21) Appl. No.: 13/682,802

(22) Filed: Nov. 21, 2012

(65) Prior Publication Data

US 2013/0126306 A1 May 23, 2013

Related U.S. Application Data

(60) Provisional application No. 61/562,170, filed on Nov. 21, 2011.

(51) Int. Cl.
| | |
|---|---|
| B65G 47/28 | (2006.01) |
| B65G 57/11 | (2006.01) |
| B65G 29/00 | (2006.01) |
| B65B 35/38 | (2006.01) |
| B65B 5/06 | (2006.01) |
| B65B 63/04 | (2006.01) |

(52) U.S. Cl.
CPC ............... *B65G 29/00* (2013.01); *B65B 35/38* (2013.01); *B65B 63/04* (2013.01); *B65B 5/061* (2013.01); *B65B 5/068* (2013.01)

(58) Field of Classification Search
CPC ..... B65G 47/1485; B65G 57/11; B65H 5/226
USPC ................ 198/377.04, 377.08, 471.1, 474.1, 198/689.1, 803.5; 141/10, 114, 160; 83/100, 152; 53/247, 553, 570; 414/789.4, 791.2, 791.3
See application file for complete search history.

(56) References Cited

U.S. PATENT DOCUMENTS

| | | | | |
|---|---|---|---|---|
| 3,822,008 A | * | 7/1974 | Benner et al. | 414/790.4 |
| 3,961,697 A | * | 6/1976 | Hartman et al. | 414/737 |
| 4,585,113 A | * | 4/1986 | Greenwell | 198/347.2 |
| 4,872,382 A | * | 10/1989 | Benner et al. | 83/152 |
| 5,220,993 A | * | 6/1993 | Scarpa et al. | 198/431 |
| 5,502,951 A | * | 4/1996 | Oliverio et al. | 53/455 |
| 5,575,187 A | * | 11/1996 | Dieterlen | 83/98 |
| 5,579,894 A | * | 12/1996 | Glazier et al. | 198/431 |
| 5,829,332 A | * | 11/1998 | Dieterlen | 83/29 |
| 6,058,818 A | * | 5/2000 | Dieterlen | 83/152 |
| 6,520,496 B2 | * | 2/2003 | Muller et al. | 270/52.01 |
| 6,553,743 B1 | * | 4/2003 | Makutonin et al. | 53/475 |
| 6,996,955 B2 | * | 2/2006 | White et al. | 53/495 |
| 7,273,142 B2 | * | 9/2007 | Huis et al. | 198/369.2 |
| 7,516,596 B2 | * | 4/2009 | Henderson et al. | 53/411 |
| 7,540,369 B2 | * | 6/2009 | Momich | 198/418 |
| 7,643,904 B2 | * | 1/2010 | Aoyama et al. | 700/248 |
| 7,767,288 B2 | * | 8/2010 | Lerner | 428/166 |
| 7,987,964 B2 | * | 8/2011 | McCabe | 198/471.1 |
| 8,240,533 B2 | * | 8/2012 | Wetsch | 225/93 |

* cited by examiner

*Primary Examiner* — Douglas Hess
(74) *Attorney, Agent, or Firm* — Wood, Herron & Evans, LLP

(57) ABSTRACT

Bandoliers of pouches or separate pouches are carried by suction cups on a transfer wheel and operated to hold and release pouches through solenoid valves, each coupled to a respective cup. The solenoid valves are operated by a controller to release pouches from the respective cups at precise angular positions of the wheel to control the configuration of the bandolier in a package or tray. Embodiments provide lateral shifting or rotation of pouches held by the cups. Fold-leading or fold-trailing bandolier configurations are produced. Solenoid valves are disposed proximate cups at the wheel periphery or elsewhere and operably coupled to the cups.

23 Claims, 13 Drawing Sheets

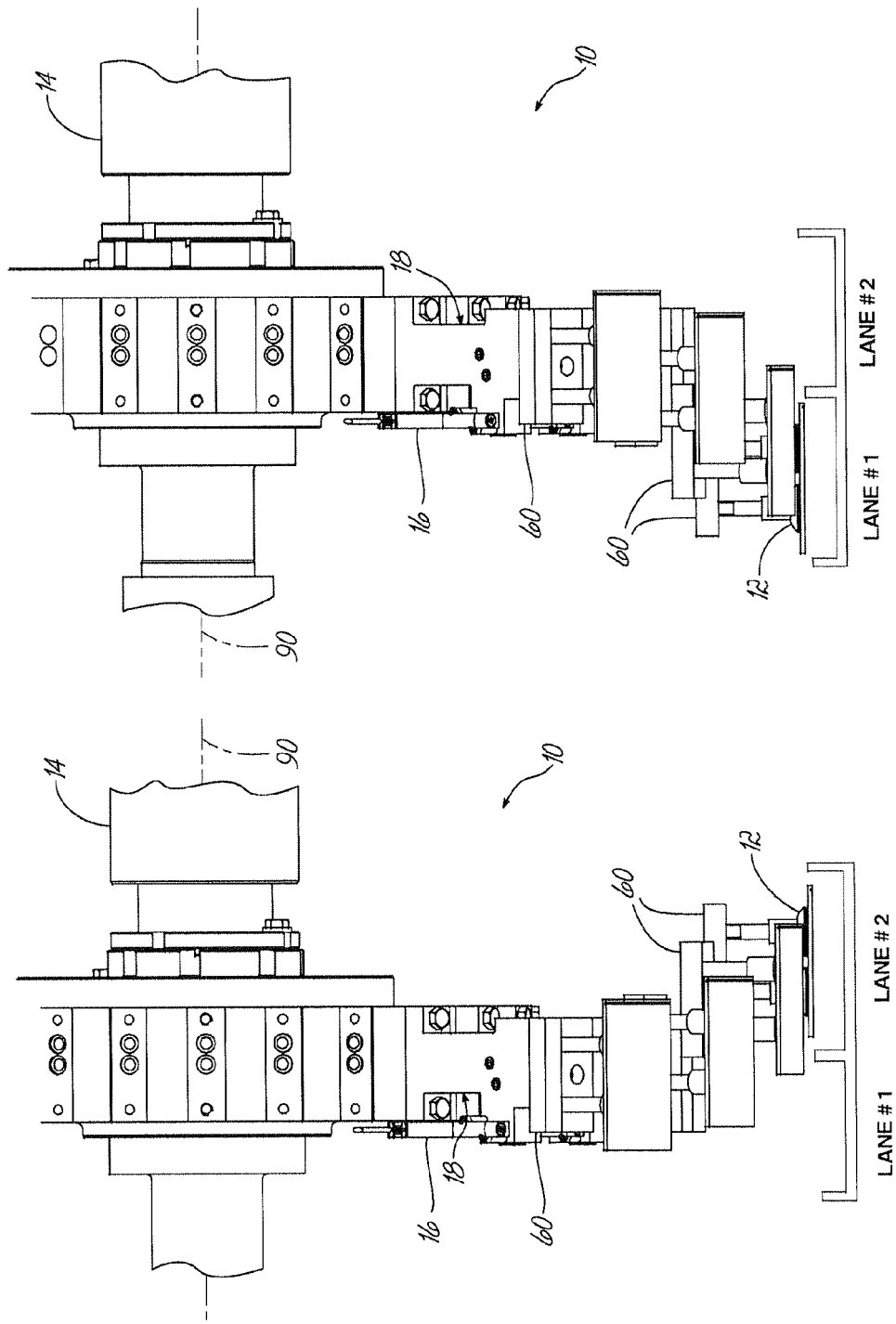

US 9,061,832 B2

POUCH TRANSFER APPARATUS AND METHODS

PRIORITY CLAIM

Applicant claims priority to U.S. provisional patent application Ser. No. 61/562,170 filed Nov. 21, 2011, which application is incorporated herein by reference.

FIELD OF THE INVENTION

This invention relates to the transfer of pouches from a rotary transfer wheel to a pouch carrier such as a bucket, carton conveyor pouch conveyor or other apparatus receiving a pouch from a transfer wheel. This invention also relates to pouch handling generally, including the process of receiving a pouch at one position and delivering it to another position, with optional, selective manipulation of the pouch between these two positions.

BACKGROUND OF THE INVENTION

Pouch transfers, including transfer wheels and drop-off wheels are old. Examples of known devices are clearly disclosed in applicant's related U.S. Pat. Nos. 5,575,187; 5,829,332; 5,220,993; 6,553,243 and 6,058,818 for example; each of these patents are incorporated herein by express reference. Of these, U.S. Pat. No. 5,220,993 discloses the use of pouch transfer wheels with a rotary knife, while U.S. Pat. Nos. 5,575,187; 5,829,332 and 6,058,818 disclose rotary knives directly dropping off cut pouches.

It is now desired to improve pouch transfers and pouch handling functionality in numerous respects, driven by market or consumer needs on the one hand, and by need to accommodate a variety of pouch manipulations and functionality in pouch transfer environments.

First, with attention to consumer or market consideration, it is appreciated that in certain countries, including Pacific Rim countries, Africa and perhaps elsewhere, such as in convenience stores where single pouches are sold, an individual consumer may wish to purchase, or only have means to purchase, a single item in a single pouch (or small multiples thereof) at a point of sale. This is opposed to more robust or affluent markets where a consumer or wholesaler may purchase large containers of individually-cut pouches in large numbers. Thus, in some countries, it is typical to find a relatively short bandolier of connected pouches hanging in a display position where a consumer or clerk may tear off only one pouch at a time. When such pouches are delivered to the market place in relatively short bandoliers, it is still desirable to provide them in cartons, flow wrappers, over wrappers, bags, shippers, or some other packaging. And preferably, it is desirable to fold the bandoliers for packaging. Accordingly, it is desirable to provide relatively short pouch bandoliers in configurations of 9, 12, 15, 16 or 20 pouch lengths, for example, in packages where the bandolier is folded two or more times. Thus, in the package, an integral bandolier of pouches has multiple folds, resulting in a multiple layer stack of pouches in short layer lengths of 2, 3, 4 or 5 layers, for example, with folds connecting each layer sequentially. Thus, as an example, it is desired to provide cartons of pouches having three pouches in each of three layers (for a nine-pouch bandolier); four layers of three pouches each or three layers of four pouches each (for a twelve pouch bandolier); five layers of three pouches each or three layers of five pouches each (for a 15 pouch bandolier); four layers of four pouches each (for a sixteen pouch bandolier); and five layers of four pouches each or four layers of five pouches each (for a 20 pouch bandolier). Other configurations are also alternately contemplated herein.

In prior pouching equipment, a rotary knife wheel or a transfer wheel without a knife itself is provided with circumferentially disposed, radially extending suction cups carrying either a plurality of single cutoff pouches or a bandolier of indeterminate length through at least a circumferential sector of the wheel. These suction cups are intermittently connected to a low pressure or vacuum source through a vacuum disc or wheel precisely machined to pass a low pressure (vacuum) to the suction cups in a pre-selected sector of the knife or transfer wheel as it rotates. Thus, for each particular operation, low pressure or vacuum is directed to suction cups through pre-determined wheel sectors, while the vacuum is broken or higher pressure is applied to cups in other sectors to eject pouches, all controlled by a precisely machined vacuum disc constructed to pass low pressure to selected suction cups through a very precisely manufactured shoe or valve disc designed for a particular feeding operation. When a differing pouch carrying or pouch drop-off pattern is desired, a machine user must then redesign and precisely manufacture a re-cut vacuum shoe or valve disc in order to produce the desired vacuum delivery and duration to the cups as they move in their circular path. This process of handling various orientations in the pouch drop-off is thus expensive and time consuming. Any such operational change-over may require even further time where trial and error is required to attain exact timing. Prior patents incorporated herein illustrate such prior devices.

In another aspect of the background of this invention, it is desirable to provide for manipulation of pouches on the transfer or knife wheel to produce or provide pouches in different orientations on the wheel, or in different positions for release and outside the normal plane of pouch drop-off. Thus, it is desirable to be able to rotate pouches on the wheel, prior to drop-off, so to change the leading edge of the pouch by 90 degrees or to some other orientation. In addition, it is desirable to be able to translate the pouches laterally (in a direction parallel to the axis of wheel rotation) to move selected pouches out of the normal drop-off plane of the wheel, and to side-step one drop-off point laterally so as to feed a supplemental take-off conveyor operating in a direction perpendicular to a major axis of rotation of the drop-off wheel.

In the past, manipulation of the pouch orientation with respect to the wheel required cumbersome and complex mechanical devices, screws, cams and the like, if provided at all.

It is therefore one objective of the invention to provide apparatus for holding and releasing pouches from a transfer wheel or rotary drop-off knife without requiring design and machining of specific rotary or pressure shoes or discs for controlling peripheral suction cups to drop pouches in varying patterns.

A further objective has been to provide apparatus and methods to fold a bandolier of pouches into multiple layers in various fold configurations.

A further objective of the invention has been to provide apparatus for a pouch transfer wheel or knife to provide a wide variety of pouch handling and transfer parameters.

Another objective of the invention has been to provide a pouch transfer wheel or rotary pouch knife which can be easily and quickly adjusted or controlled to vary the pouch drop-off parameters.

A further objective of the invention has been to provide a pouch transfer wheel or a rotary knife drop-off wheel capable of orienting, translating or otherwise manipulating one or more pouches carried thereby.

SUMMARY OF THE INVENTION

To these ends, one embodiment of the invention contemplates a rotatable knife wheel or a rotatable transfer wheel where pouches in either individual or bandolier format are held in stations proximate the periphery of the wheel by one or more suction cups. A valve, such as a solenoid valve, is also oriented preferably proximate the wheel periphery at each pouch station. While a pouch-holding low pressure or vacuum is constantly presented to the suction cups to hold pouches thereon, the solenoid valves are selectively operable to break the vacuum (or even pass a higher ejection pressure) to the cups to eject the pouches from selected cups at programmable positions or angular phases of the wheel. Each valve is controlled by a programmable controller to hold or eject a pouch held by the respective cup associated with the valve at pre-selected stations about the peripheral path of the wheel. The controller is operated to cause pouches to drop from the wheel in discretionary formats resulting in a wide variety of released pouch configurations. Bandoliers of pouches can be dropped off the wheel in fold leading or fold trailing configurations to produce folded bandoliers of pouches in a wide variety of layer numbers and pouches per layer.

In other configurations, an embodiment of the invention of selectively operable valves are not oriented at or proximate the cups of the wheel periphery, but are centrally located with respect to the wheel or elsewhere in the apparatus where they are operatively coupled through a slip ring to the suction cups directly.

Multiple folded pouch bandoliers can be produced with one, two or more folds, or no folds, as desired, with the solenoid/cup operation changed or programmed as desired, all without requiring any valve disc or shoe design engineering, manufacturing, and replacement. Accordingly, a wide variety of pouch and bandolier configurations can be transferred from the wheel merely by adjusting or setting the program.

In alternative embodiments, and for example, the suction cups can themselves be rotationally mounted about axes extending in radial directions from the wheel axis such as by mounting them on servo motors or rotary solenoid valves, and for turning pouches where desired. Suction cups could be mounted for shifting movement in a direction parallel to the wheel axis for shifting pouches or bandoliers for multiple lane drop-offs.

Use of controllable valves mounted at the wheel periphery at each pouch station permit a wide variety of programmable transfer configurations, and without additional hardware manufacture or cost. Drop-off to intermittent and continuous receiving devices such as buckets, cartons, conveyors and the like are easily programmed.

These and other advantages will become readily apparent from the following description and from the drawings in which:

BRIEF DESCRIPTION OF THE DRAWINGS

FIG. 5 is an elevational view of the embodiment of FIG. 4 showing the cups shifted to the right over a lane 2;

FIG. 6 is a view similar to FIG. 5 but showing the cups shifted to the left over another lane 1;

DETAILED DESCRIPTION OF THE INVENTION

Figure 1:
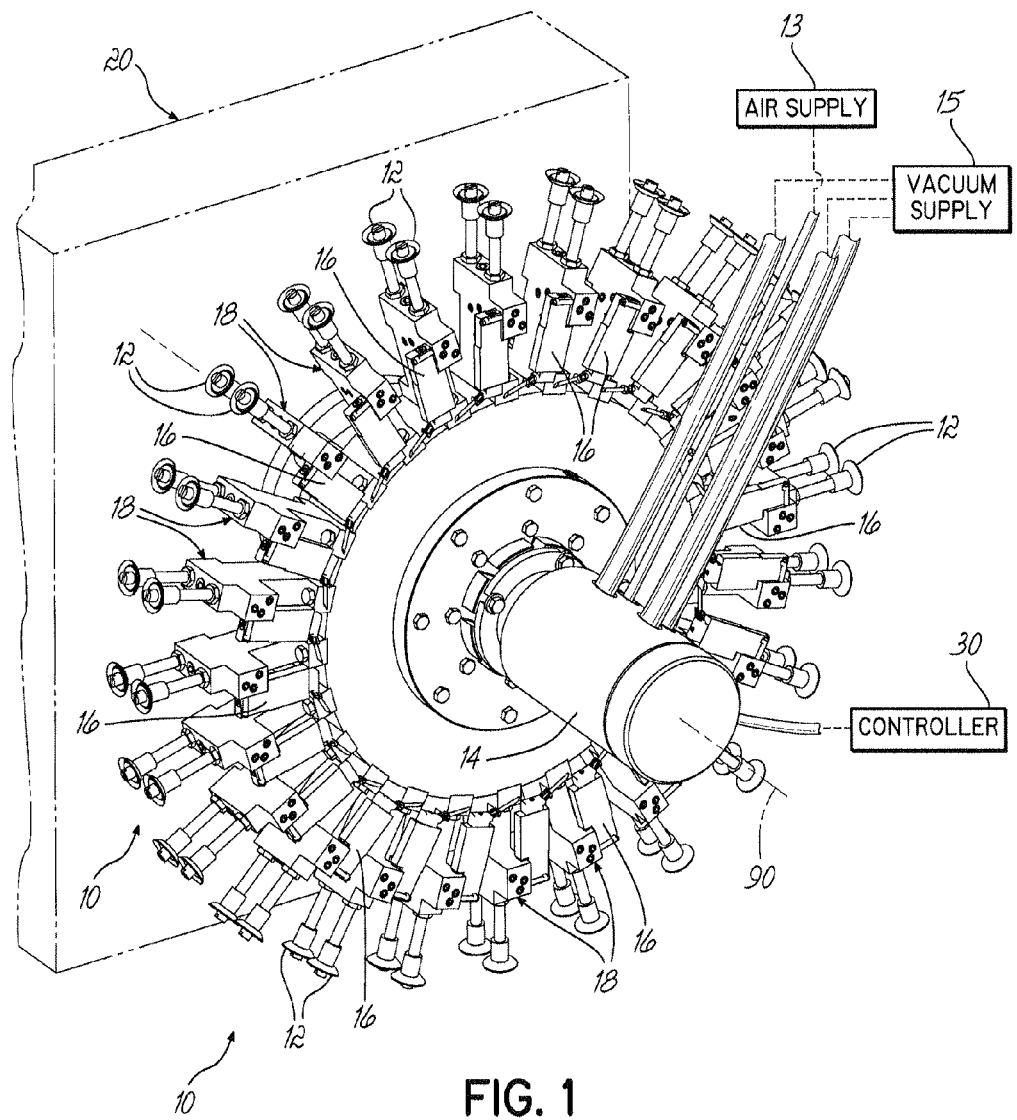
FIG. 1 is an isometric view of one embodiment of the invention, showing the wheel and radially extending suction cups on a machine frame.

Turning to the Drawings, FIG. 1 illustrates a transfer wheel 10 rotatably mounted in any suitable manner to a machine or frame 20 and preferably part of a pouch forming apparatus (not shown) where pouches in a sequential train of pouches are presented to wheel 10 in bandolier format (see FIGS. 9-10).

A bandolier (not shown in FIG. 1) may be of an indeterminate length or number of pouches; however, for purposes of this disclosure, the bandoliers shown in the following FIGS. 9A-9H and 10A-10E are of twelve pouches each, for clarity. Bandoliers could be in lengths of 8, 9, 12, 15, 16, of 20 pouches, for example, or any other lengths, and which are desired to be folded into 2, 3, 4, or 5 bandolier layers, or more where desired.

For purposes of clarity only, a bandolier of twelve pouches is shown folded into three layers in these Figures.

For FIG. 1, wheel 10 includes a plurality of radially extended suction cups 12 preferably mounted side-by-side in sets of two cups each, although the cups may be mounted singly or in sets of more than two cups each.

Wheel 10 is rotatably mounted about an axis 90 of a non-rotating hub or "union" 14 configured to pass air from air supply 13 or vacuum from vacuum supply 15 through wheel 10 to cups 12 via solenoid valves 16 mounted proximate cups 12 near the outer periphery of wheel 10 and on manifold 18. Vacuum is continuously passed to the cups. Each valve 16 is operational to selectively break that vacuum or direct higher pressure air to eject pouches from the cups.

Figure 2:
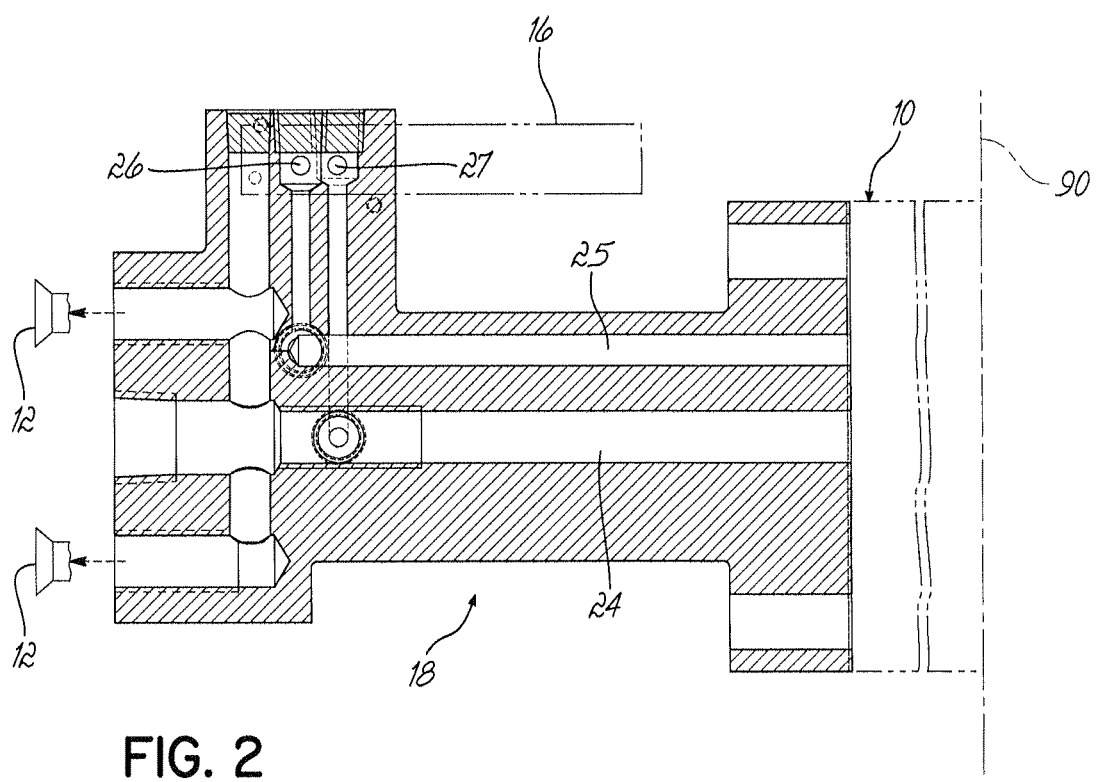
FIG. 2 is a cross-sectional view of a manifold on the wheel for selectively directing vacuum to respective suction cups and air to respective solenoid valves of the invention.
Figure 3:
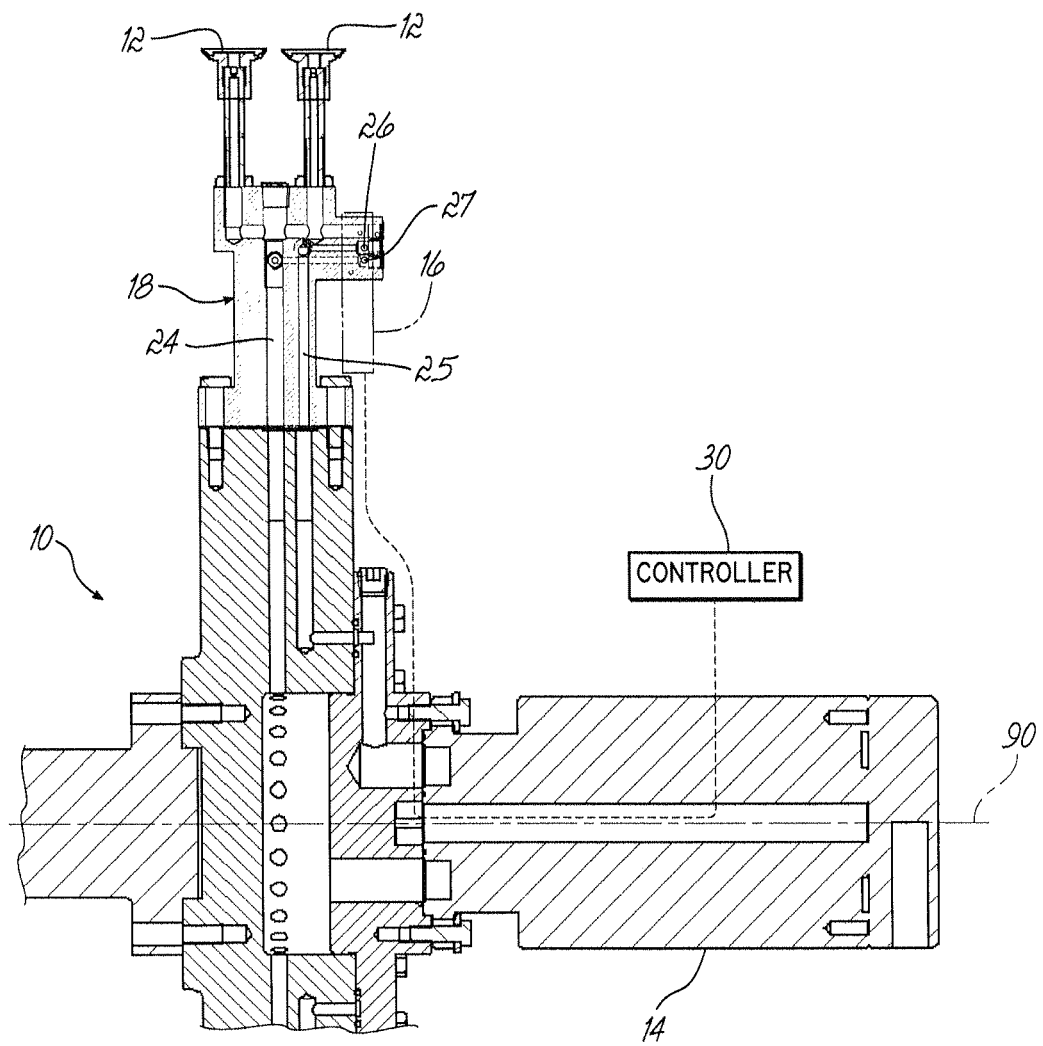
FIG. 3 is a cross-sectional view of the wheel and union providing air and electrical connection to the solenoid valves, the dashed lines only diagrammatically indicating control and passage links.

FIGS. 2 and 3 illustrate the interconnection of hub or union 14 and valves 16 of FIG. 1. More particularly, manifold or fitting 18 is configured for mounting on wheel 10 as a part thereof, also rotational with wheel 10 about axis 90. As best shown in FIG. 2, fitting 18 defines a vacuum passage 24 and a vent or air pressure passage 25 interconnected to sources of each at union 14.

Union 14 is a union made by Dynamic Sealing Technologies of Andover, Minn. under Model No. GP Series for connecting vacuum, air and electric signals to the periphery of wheel 10.

Solenoid valve 16 is an electrically operated valve ported at ports 26, 27 to respective passages 24 and 25 as shown in FIG.

2. Air from passage 25 is present at solenoid 16, while vacuum from passage 24 is always present to cups 12 in each cup set. When the solenoid valve is energized air (or vent) is opened through valve 16 to the vacuum passage 24 and/or the vacuum plenum for cups 12, overcoming the vacuum at cups 12 and then releasing or ejecting any pouch held thereon. Operation of valves 16 is precisely controlled through a programmable controller 30 (not shown in detail) of any suitable type connected through union 14 to valves 16. Such a controller may be model a suitable programmable control of the type made by Allen Bradley of Milwaukee, Wis., under its line of products such as that known as ControlLogix, and capable of directing electrical signals to valves 16.

It will be appreciated that any suitable union 14 and any suitable solenoid valves 16 can be used to these ends, the significant feature being the individual control of cups 12 through any suitable valves and controllers so that pouches can be individually held and selectively released from the cups at any selected and programmable angular position of wheel 10. It is that flexibility which provides the selective drop off and desired folding configuration of bandoliers of pouches into containers or trays as will be described.

Turning now to FIGS. 9A through 9H, there is described the invention and method by which a "fold trailing" pouch bandolier of twelve pouches, for example, is dropped from wheel 10 into a succession of moving trays, containers or packages 36, 37 carried along on a suitable conveyor 38 in a machine direction MD, or in a cross machine direction (not shown here).

Figure 9A:
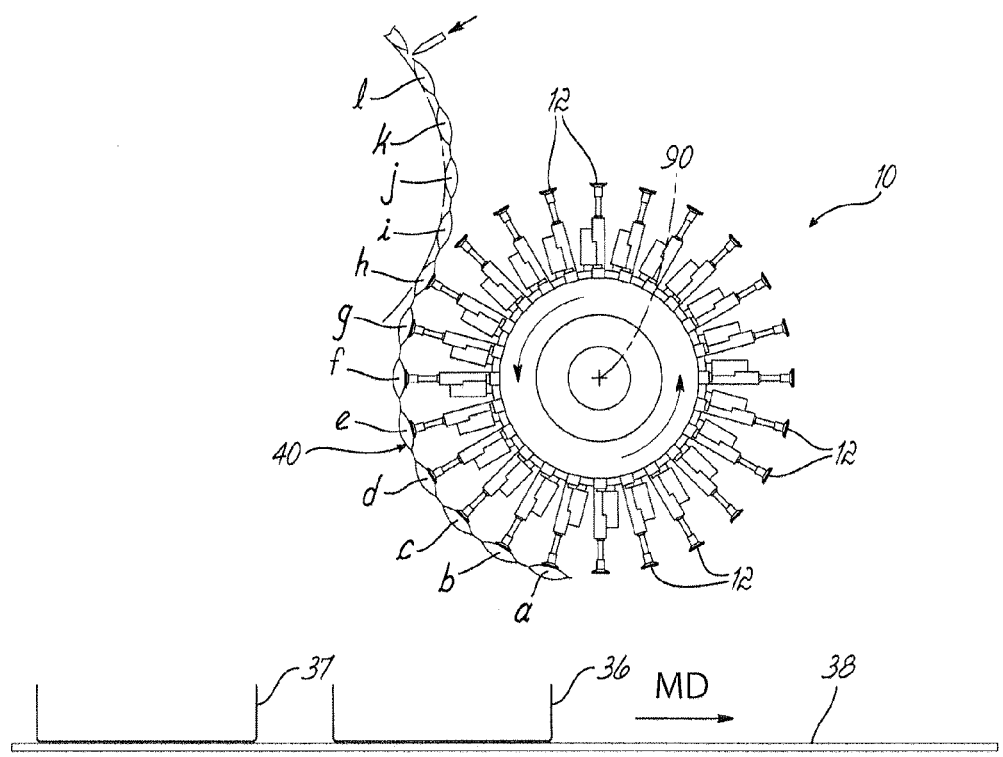
FIGS. 9A through 9H are diagrammatic elevational views of the invention illustrating a sequential bandolier of pouches dropping off the rotating transfer wheel in a "leading fold" configuration into a moving container.
Figure 9B:
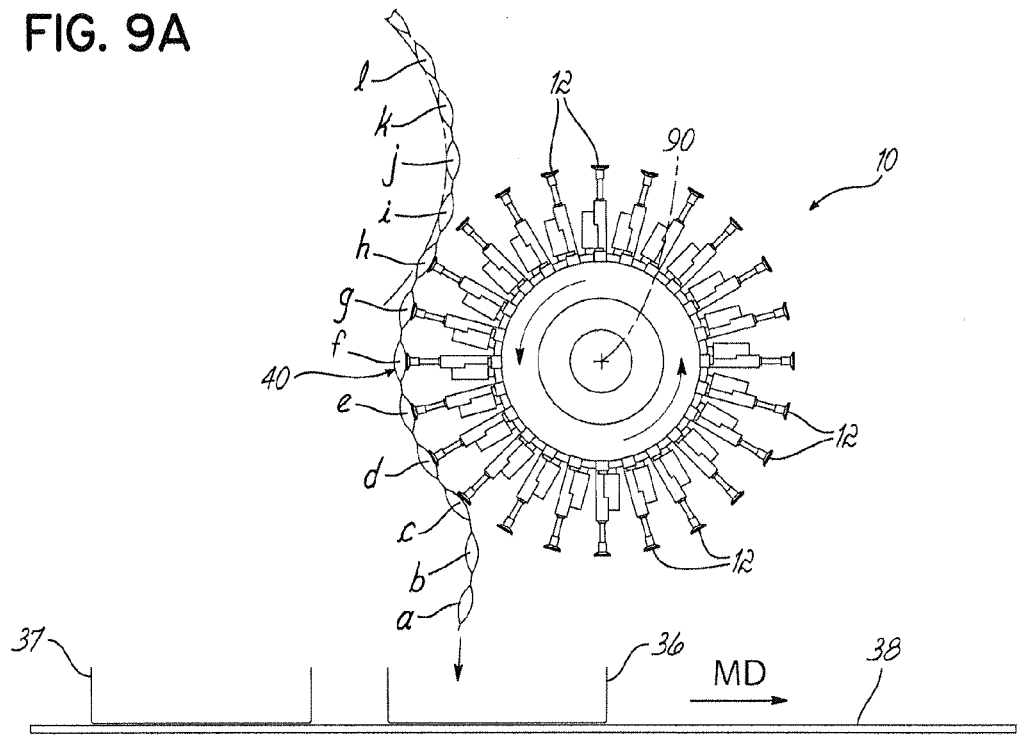

Bandolier 40 is comprised of twelve pouches "a" through "l" (FIG. 9A). Pouches "a" through "h" have been transferred by upstream apparatus (not shown) while remaining pouches i through l have yet to be introduced to cups 12 on wheel 10, which rotates in a counter clockwise direction (FIG. 9A) as conveyor 38 and trays 36, 37 move downstream under wheel 10, cups 12 have released pouches a and b while retaining pouches c through h (FIG. 9B).

Figure 9C:
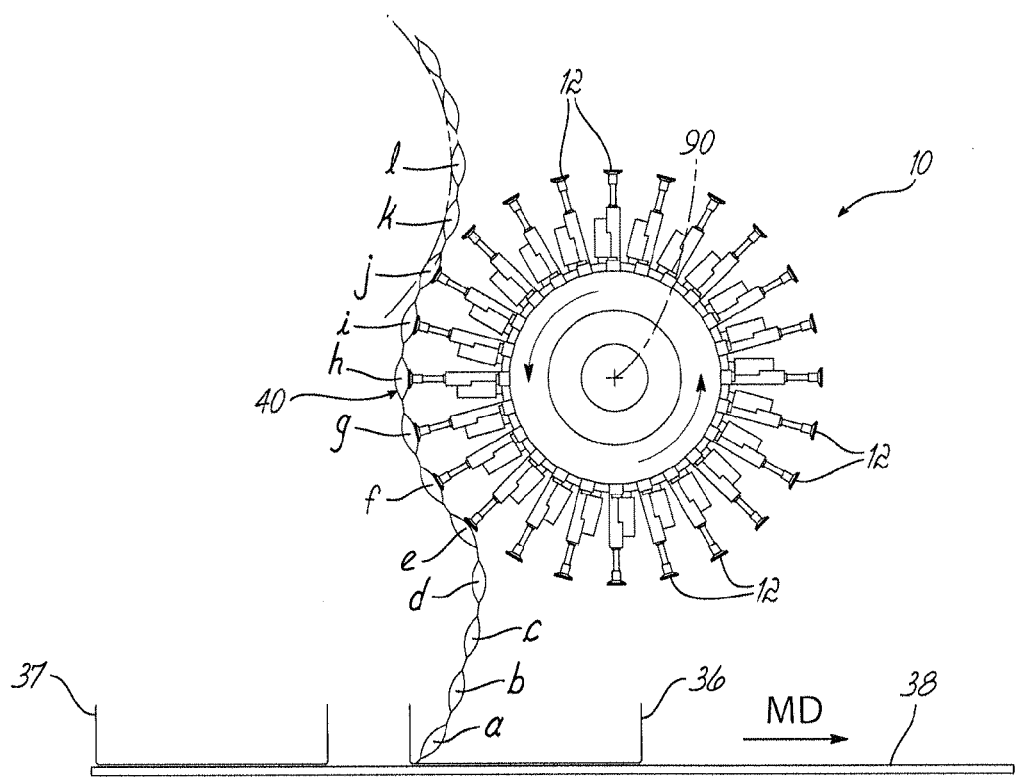
Figure 9D:
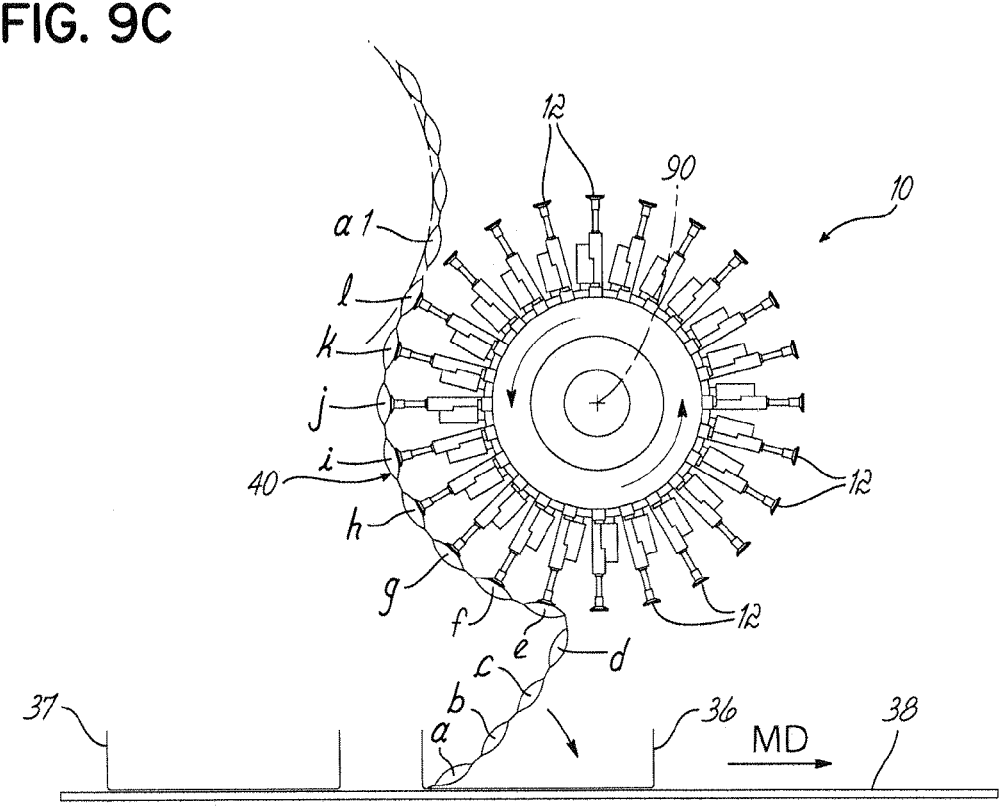

In FIG. 9C, wheel 10 continues its counter-clockwise rotation, with lead pouch "a" dropping into tray 36; rotation of wheel 10 carrying pouches "b, c and d" forwardly above tray 36 as in FIG. 9D, with pouches "e through l" held by cups 12 on wheel 10. At this point, bandolier 40 is deposited forwardly into tray 36 (FIG. 9D) while a pouch $a^1$ of a trailing, separate bandolier is approaching cups 12 on wheel 10.

Figure 9E:
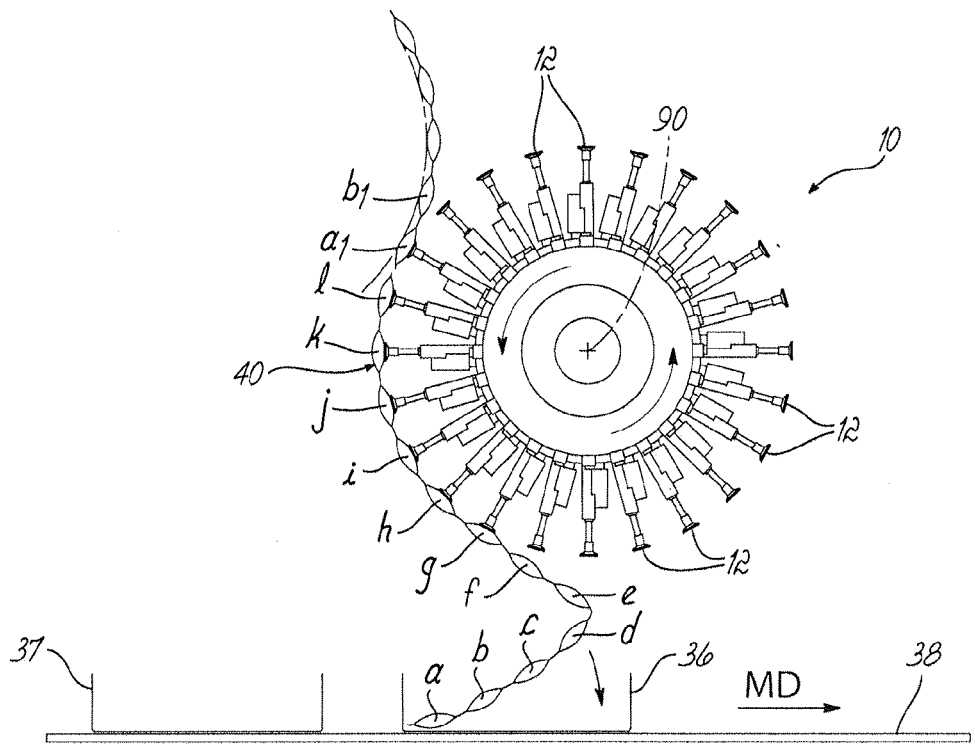

This continues as in FIG. 9E with pouches "e" and "f" releasing from wheel 10 and pouches $a^1$, $b^1$ and so on approaching wheel 10.

Figure 9F:
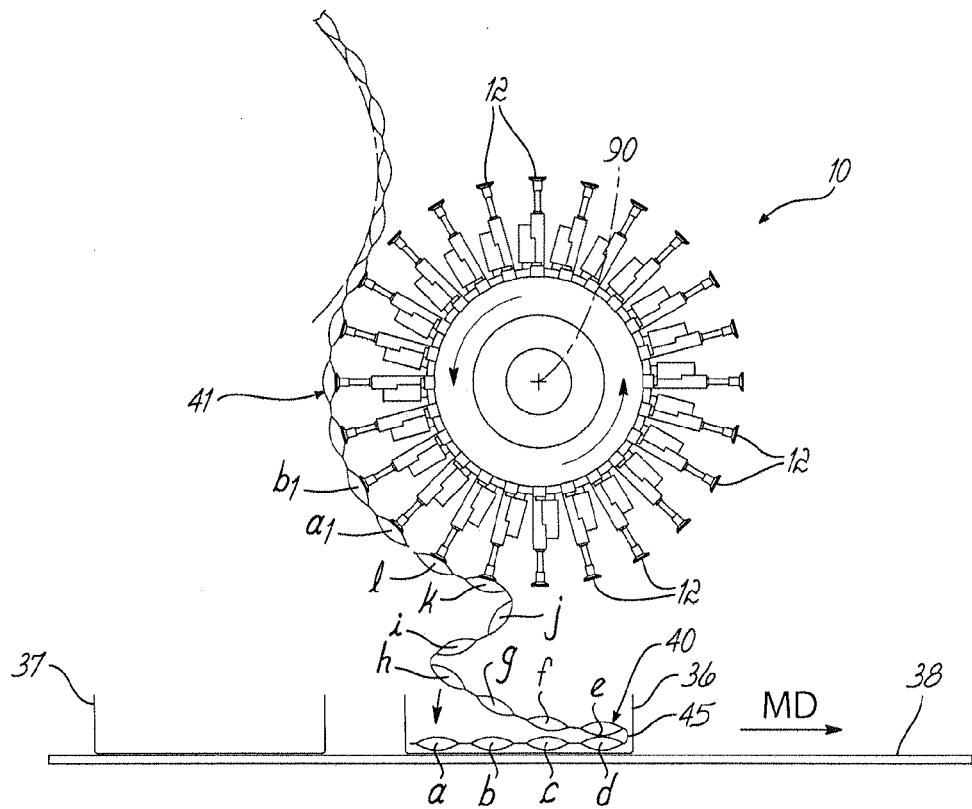

In FIG. 9F, pouches "a" through "d" are deposited into tray 36, with bandolier folding in a leading fold 45 and following pouches "e" through "h" being laid onto the under layer of pouches "a-d".

Figure 9G:
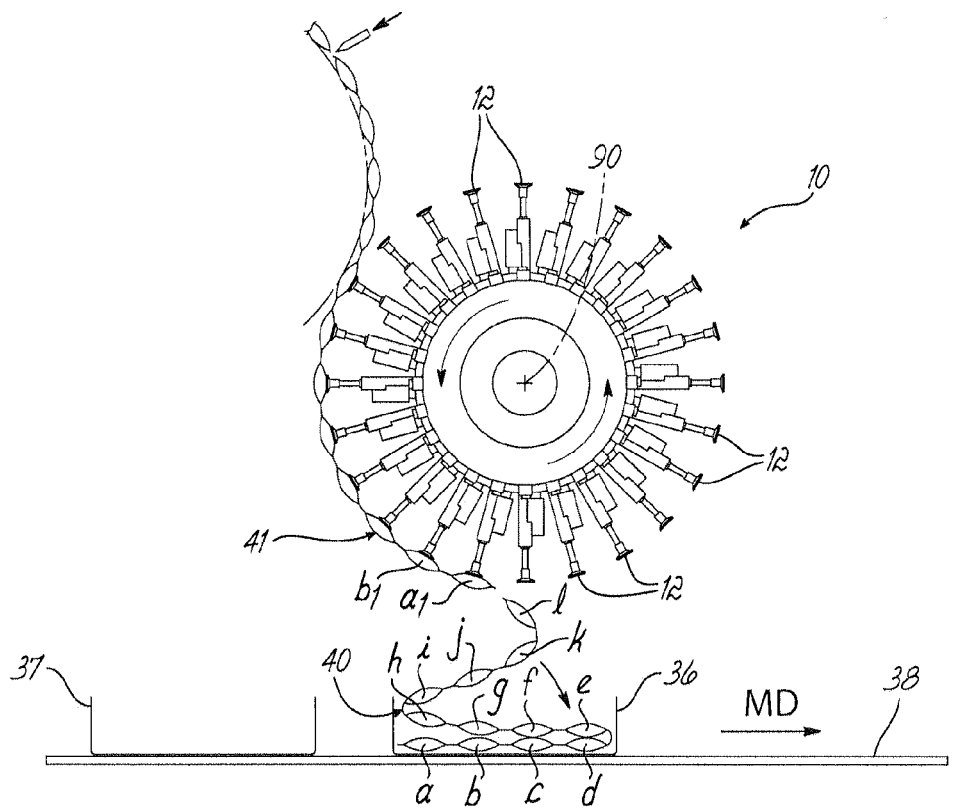

Once pouches "e-h" are laid onto pouches "a-d", bandolier 40 folds again so final pouches "i" through "l" are laid onto the second layer of pouches "e-h". (FIGS. 9G-9H)

Figure 9H:
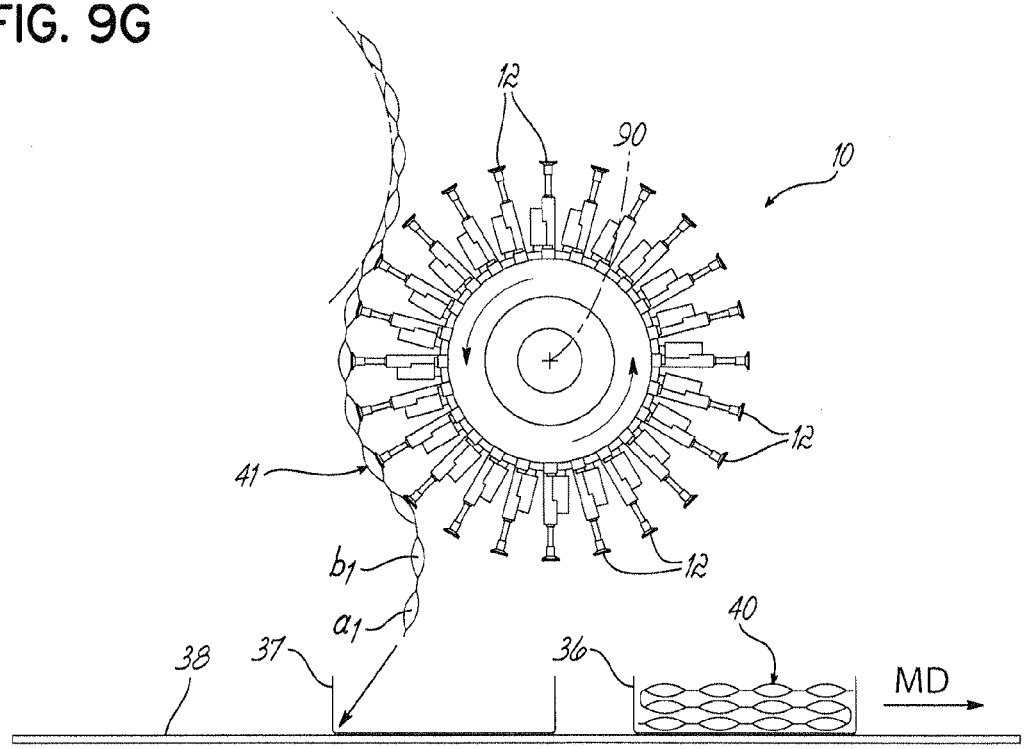

FIG. 9H illustrates the final 3-layer folded bandolier 40 in tray 36. At this point, lead pouches $a^1$ and $b^1$ of following bandolier 41 are released from wheel 10 as bandolier 41 is folded, likewise, into following tray 37. Thus a bandolier 40, and succeeding bandoliers are deposited into trays 36, 37, etc. in a "fold leading" configuration. It will be appreciated that a gate, collector or other timing apparatus could be oriented to initially receive the dropped off bandolier prior to a final package or packaging tray.

Figure 10A:
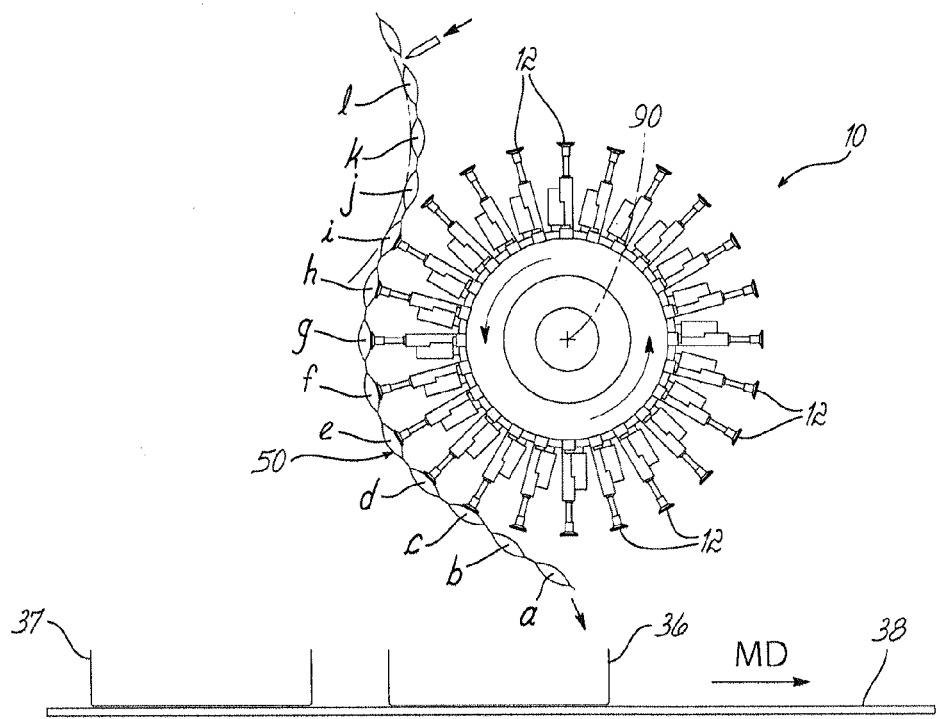
FIGS. 10A through 10E are diagrammatic elevational views of the invention illustrating a sequential bandolier of pouches dropping off the rotating transfer wheel in a "trailing fold" configuration into a moving container.
Figure 10B:
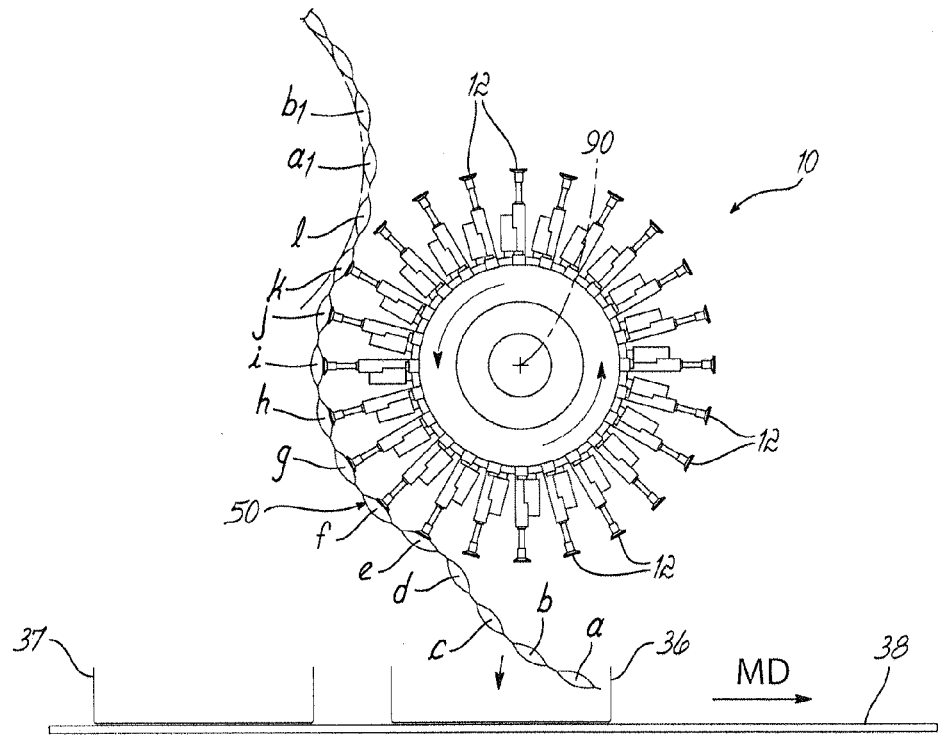
Figure 10C:
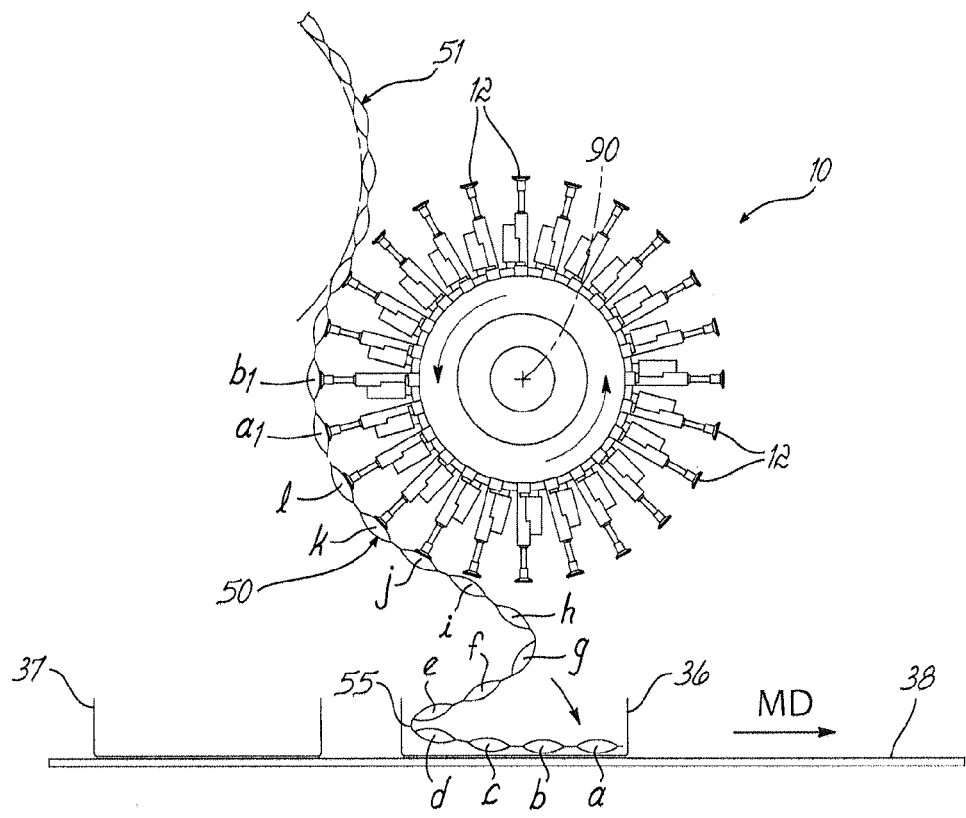
Figure 10D:
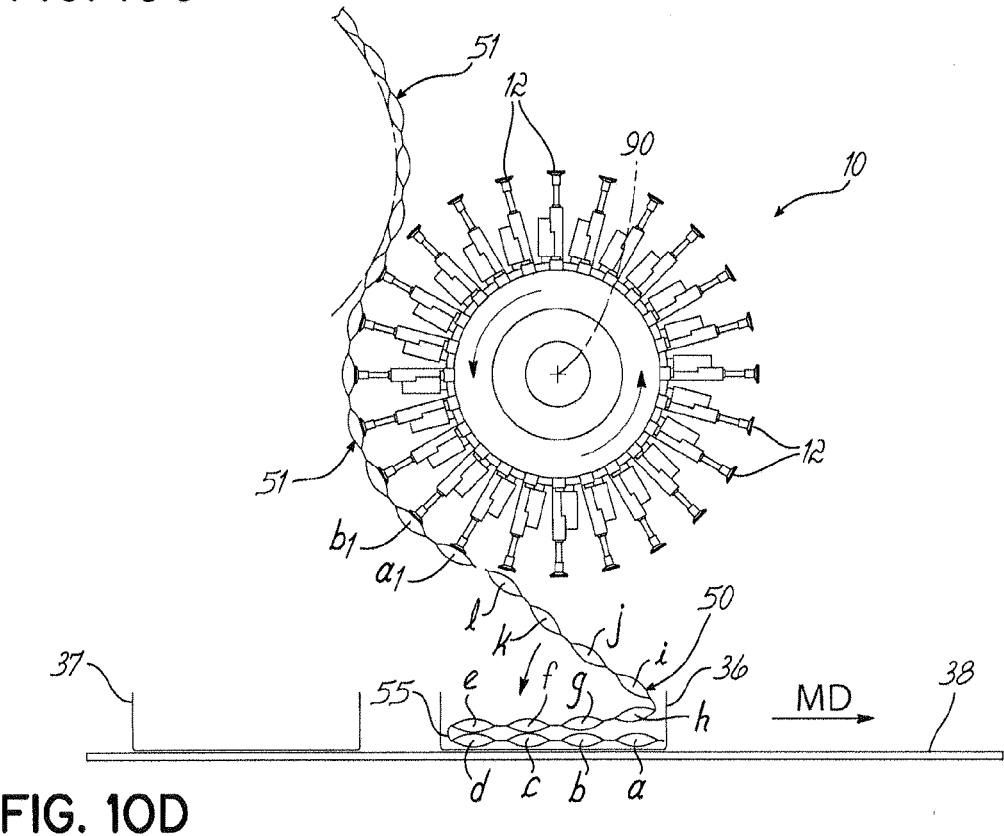
Figure 10E:
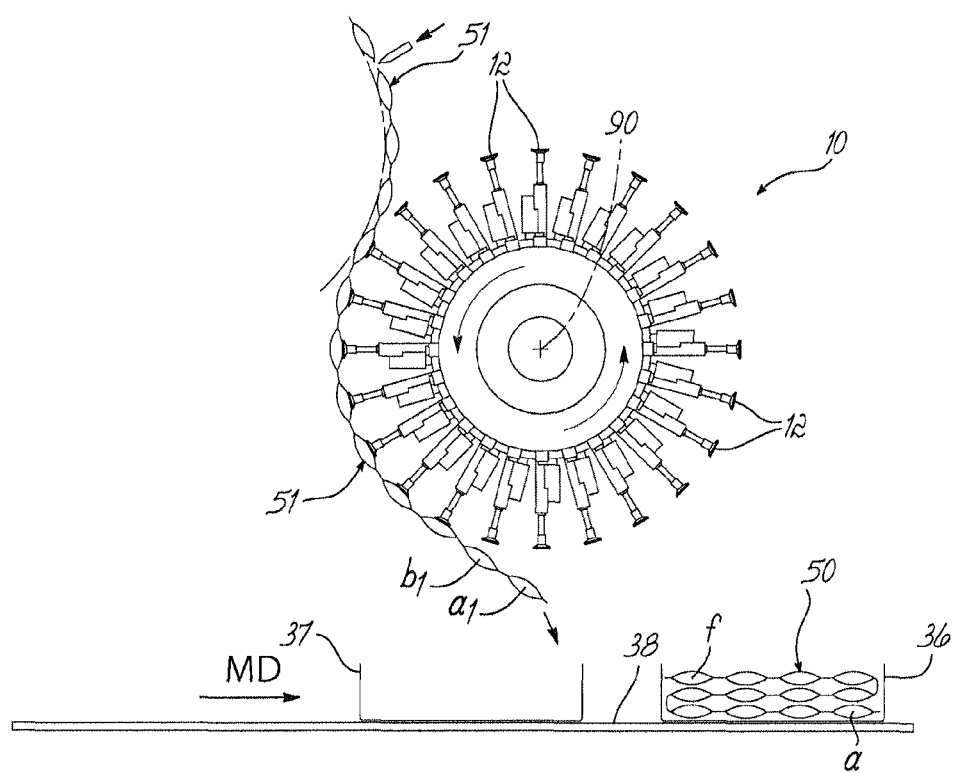

FIGS. 10A-10E similarly illustrate the sequential loading of a 12-pouch bandolier 50 into trays 36, 37 carried on conveyor 38 moving in machine direction MD as wheel 10 turns counterclockwise. In this mode of operation, pouches "a" through "l" are carried by wheel 10, but the leading pouches are held on wheel 10 layer so pouch "a" is deposited near the lead end of tray 36, rather than its trail end. As wheel and tray rotation continue, pouches "a-d" are laid into tray 36 (FIG. 10c) while the cups 12 are controlled by solenoid valves 16 to hold pouches, "e-g", for example, a little longer, causing bandolier 50 to fold forwardly, leaving a trailing fold 55 between pouches "d" and "e". This continues as in FIG. 10D until following pouches folding back onto pouches "e-h" to form a third layer, as shown in FIG. 10E, for tray 36 and a new bandolier 51 being similarly fed to following tray 37 with pouch $a_1$ leading. This produces a trailing fold configuration of a pouch bandolier in the trays.

In the operations of FIGS. 9A-9H and 10A-10E, it will be appreciated that the relative speeds of the trays 36, 37 and the wheel 10 can be adjusted, as are the particular drop-off positions of pouches relative to the angular position of wheel 10, to produce the desired folding effect. The drop-offs are controlled by the programmable controller to drop or release pouches in a desired timing to accomplish a variety of bandolier configurations, and to handle a variety of pouch sizes and the like, all without the need for machining or replacing a precise vacuum shoe or disc. Change-outs are thus accomplished by simple programming without requiring machine down time for mechanical modification, and costs are reduced since there is no duplicity of machined vacuum disc or shoes.

Figure 4:
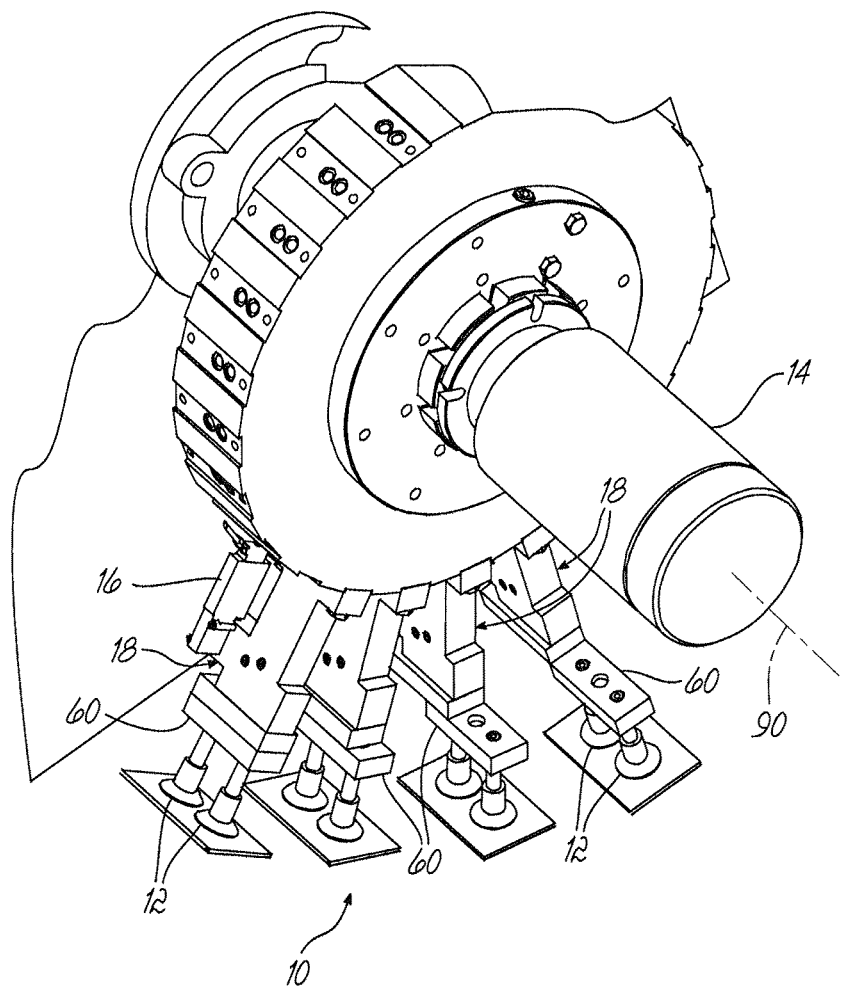
FIG. 4 is an isometric view of an alternative embodiment of the invention illustrating a shiftable set of suction cups on a transfer wheel.

Turning back now to the alternative embodiments of FIGS. 4-6 and FIGS. 7-8, the embodiment of FIGS. 4-6 illustrates a modification providing for feeding two side-by-side, preferably parallel drop-off lanes 1 and 2. For this configuration, wheel 10 is provided with radially extending cups 12 as previously described. However, each cup set is mounted on a shiftable base or slide 60, pneumatically connected and controlled by a valve to shift in a direction parallel to the extension of axis 90, about which wheel 10 rotates. This shifting can be accomplished with or without coordination of pouch drop-off.

Slide 60 can be of any suitable structure controlled to shift left or right as wheel 10 rotates.

In FIG. 5, for example, slide 60 is shifted to the right to dispose pouch-holding cups over lane 2 (which may comprise a conveyor with pouch or bandolier receiving trays) and from which cups the pouches can be dropped into lane 2. In FIG. 6, slide 60 has been shifted to the left to maneuver cups 12 to the left, operably over lane 1, so pouches on the cups can be dropped onto the take-away apparatus of lane 1.

Pouches and/or bandoliers can be dropped alternatively, or on demand into lanes 1 or 2 as desired.

Slide 60 may be of any suitable structure, such as a linear pneumatic slide of any suitable type or design.

Figure 7:
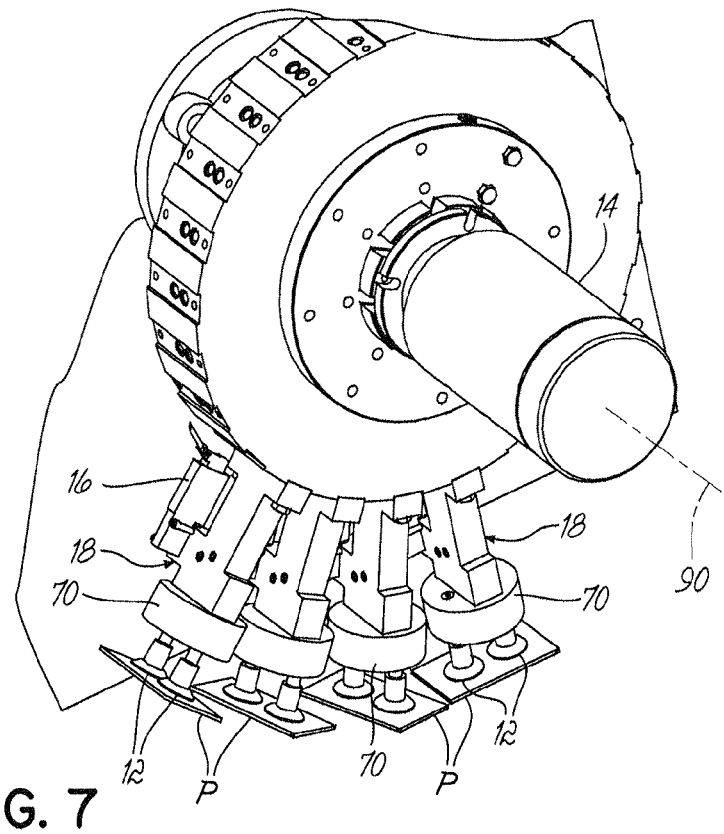
FIG. 7 is an isometric view of another embodiment of the invention showing rotary cup sets.
Figure 8:
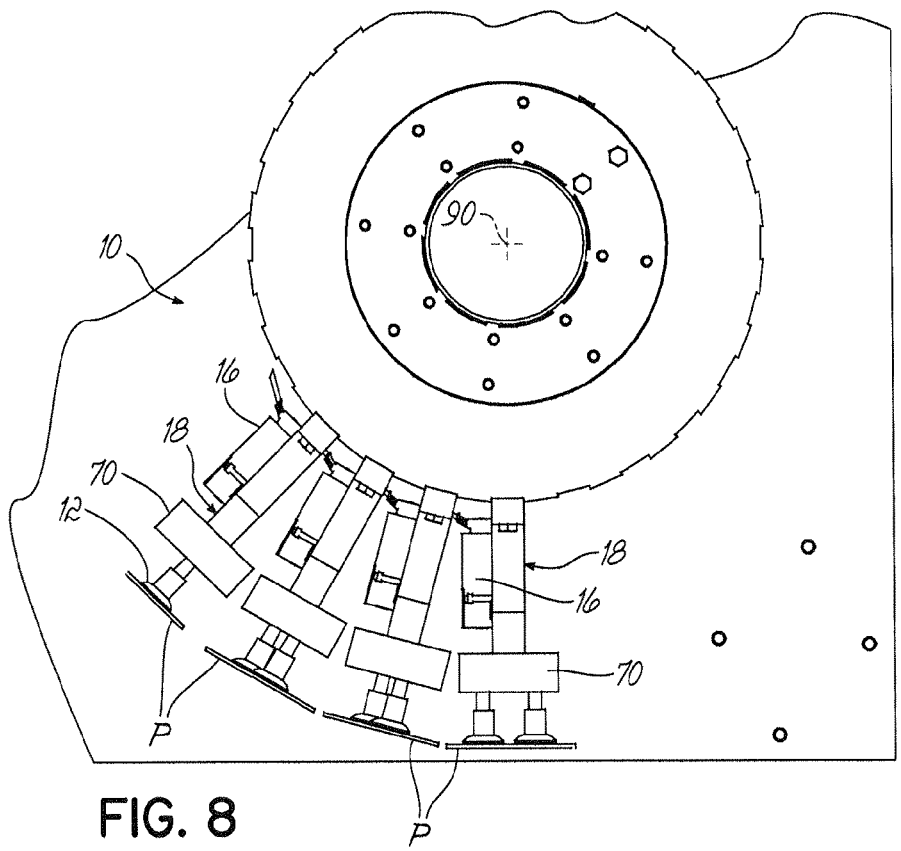
FIG. 8 is an elevational view similar to FIG. 7 and showing the rotation of the cup sets as they move around on the wheel.

FIGS. 7 and 8 illustrate an embodiment of the invention wherein individual pouches P are not shifted, but rather are rotated while on wheel 10. In this embodiment, sets of two vacuum cups 12 each are mounted on a rotating coupling apparatus 70 disposed on manifold 18. Coupling 70 is operably connected through appropriate passages to vacuum or pressurize a passage connected by solenoid valves 16 to hold or eject pouches on the cups 12. However, the cup sets can be rotated through 90° or 180° via a valve, independently of the pouch discharge or in time therewith to reorient the alignment of separate pouches thereon where such rotation of pouches is required prior to drop off into a package, tray or the like. Thus, in FIGS. 7-8, a rectangular pouch P is rotated from a long side leading to a short side leading orientation while on wheel 10. Rotation is generally about an axis extending radially from wheel 10 perpendicularly to axis 90.

Coupling 70 may comprise any suitable structure, such as a rotational pneumatic actuator of any suitable type or design.

It will be appreciated that the ability to precisely drop off or release pouches from exact points on the wheel as it turns provides a large variety of pouch handling features, not only for the bandolier folding operations or the pouch shifting or rotational orientations as described but for numerous other pouch handling operations as will be appreciated by those in the art, and all without the need for separately machined control disks. As an example only, the selective deposit of diverse pouches onto diverse targets is fully attainable with the invention.

Moreover, it will be appreciated that the operable disposition of a respective valve at each circumferential cup station can be used to rotate the cups and pouches thereon; to shift the cups and pouches thereon or to selectively hold and discharge pouches thereon, independently for these respective operations only without being coupled to or performed with these other operations.

These and other modifications and advantages will be readily apparent to those of ordinary skill in the art without limitation and applicant intends to be bound only by the claims appended hereto.

What is claimed is:

1. Pouch transfer apparatus for transferring bandoliers comprising a plurality of pouches serially connected together and said apparatus comprising:
   a plurality of pouch-holding capable suction cups oriented in a circumferential pattern of stations extending radially from an axis of rotation;
   a valve operably connected to a cup at each said station for selectively coupling to a cup oriented at that station a pouch holding suction and a pouch discharge pressure; and
   a programmable controller for selectively operating said valves for holding or discharging pouches from said cups respectively coupled to respective valves, for folding said bandolier of pouches upon itself.

2. Apparatus as in claim 1 wherein said valves are oriented proximate said cups at said station.

3. Apparatus as in claim 1 wherein said apparatus is programmed to hold multiple pouches connected one to the other.

4. Pouch transfer apparatus comprising:
   a plurality of pouch-holding capable suction cups oriented in a circumferential pattern of stations extending radially from an axis of rotation;
   a valve operably connected to a cup at each said station for selectively coupling to a cup oriented at that station and a pouch discharge pressure; and
   a programmable controller for selectively operating said valves for holding or discharging pouches from said cups respectively coupled to respective valves, and
   wherein said apparatus is programmed to hold multiple pouches connected to one to the other, and,
   wherein said controller is programmed to drop off selected pouches from selected stations while holding other pouches at other stations and later dropping said other pouches to generate a folded bandolier dropped from said stations.

5. Apparatus as in claim 4 wherein said apparatus is programmed to drop a folded bandolier with a leading fold.

6. Apparatus as in claim 4 wherein said apparatus is programmed to drop a folded bandolier with a trailing fold.

7. Pouch transfer apparatus comprising:
   a plurality of pouch-holding capable suction cups oriented in a circumferential pattern of stations extending radially from an axis of rotation;
   a valve operably connected to a cup at each said station for selectively coupling to a cup oriented at that station and a pouch discharge pressure; and
   a programmable controller for selectively operating said valves for holding or discharging pouches from said cups respectively coupled to respective valves, and further including respective operable links from said controller to said valve at each station to selectively open and close said valve independently of the operation of others of said valves.

8. A method of transferring pouches from suction cups mounted in circumferentially-oriented stations on a rotatable wheel and respectively operated by a respective valve operably connected to suction cups, said method comprising:
   operating each said valve independently from each other valve to hold a pouch on a cup associated with said each valve; and
   selectively operating each said valve independently from each other valve to discharge a pouch on a cup associated with each said valve.

9. A method as in claim 8 including programming a programmable controller to control each valve independently of each other valve.

10. A method as in claim 8 including the step of operating a respective valve oriented at each station and operating a suction cup at each station with a respective valve at said station.

11. A method as in claim 8 including dropping from said wheel individual, independent pouches.

12. A method as in claim 8 including dropping from pouches said wheel in a bandolier of connected pouches.

13. A method as in claim 12 including the step of folding said bandolier.

14. A method as in claim 13 including folding said bandolier with an initial leading fold.

15. A method as in claim 13 including folding said bandolier with an initial trailing fold.

16. A method as in claim 13 including folding said bandolier with a plurality of folds.

17. A method of transferring pouches carried by suction cups in a circular path including the steps of dropping connected pouches in the form of a folded bandolier into a preconfigured receiver wherein said bandolier includes at least one fold.

18. A method as in claim 17 including selectively operating respective valves, operably connected to respective ones of said suction cups, from a programmable controller operably connected to said respective valves.

19. A method as in claim 17 including folding said bandolier with a leading fold.

20. A method as in claim 17 including folding said bandolier with a trailing fold.

21. A method of handling pouches held by suction cups mounted rotationally in circumferentially-oriented stations on a rotatable wheel and respectively operated by a respective valve, said method comprising:
   operating each said valve independently from each other valve to rotate a suction cup associated with said each valve.

22. A method of handling pouches held by suction cups mounted in circumferentially-oriented stations on a wheel rotatable about an axis of rotation, said cups shiftable in a linear direction parallel to said axis of rotation and respectively operated by a respective valve, said method comprising:

operating each said valve independently from each other valve to linearly shift said cup associated with said each valve.

23. Pouch transfer apparatus for transferring extended bandoliers of serially connected pouches into a selected folded configuration wherein a bandolier is folded upon itself in a plurality of folded pouch layers of fewer pouches than in said extended bandolier said apparatus comprising:

a plurality of pouch-holding capable suction cups oriented in a circumferential pattern of stations extending radially from an axis of rotation;

a valve operably connected to a cup at each said station for selectively coupling to a cup oriented at that station and a pouch discharge pressure; and a programmable controller for selectively operating said valves for holding or discharging pouches from said cups respectively coupled to respective valves such that said bandolier is folded upon itself with a leading fold or a trailing fold.

\* \* \* \* \*

UNITED STATES PATENT AND TRADEMARK OFFICE
CERTIFICATE OF CORRECTION

PATENT NO. : 9,061,832 B2  
APPLICATION NO. : 13/682802  
DATED : June 23, 2015  
INVENTOR(S) : Rack et al.

Page 1 of 1

It is certified that error appears in the above-identified patent and that said Letters Patent is hereby corrected as shown below:

In the Specification:
Column 1, line 6, "Applicant claims" should be ---Applicants claim---.

Column 1, line 14, after "carton conveyor" insert --,--.

Column 1, line 25, "applicant's" should be ---Applicants'---.

Column 1, line 27, "are" should be ---is---.

Column 3, line 51, "permit" should be ---permits---.

Column 3, lines 55, "are" should be ---is---.

Column 5, line 10, "may be model a suitable programmable control" should be ---may be a suitable model for programmable control---.

Column 7, line 22, "applicant intends" should be ---Applicants intend---.

In the Claims:
Column 7, line 56, Claim 4 "pouches connected to one to the other" should be ---pouches connected one to the other---.

Column 9, line 11, Claim 23 after the word "bandolier" insert --,--.

Signed and Sealed this  
Third Day of May, 2016

Michelle K. Lee  
*Director of the United States Patent and Trademark Office*